July 19, 1960
S. CRISTIANI
2,945,526
MANUALLY CONTROLLED PORTABLE HYDRAULIC COMPRESSORS
Filed Aug. 10, 1955
3 Sheets-Sheet 1
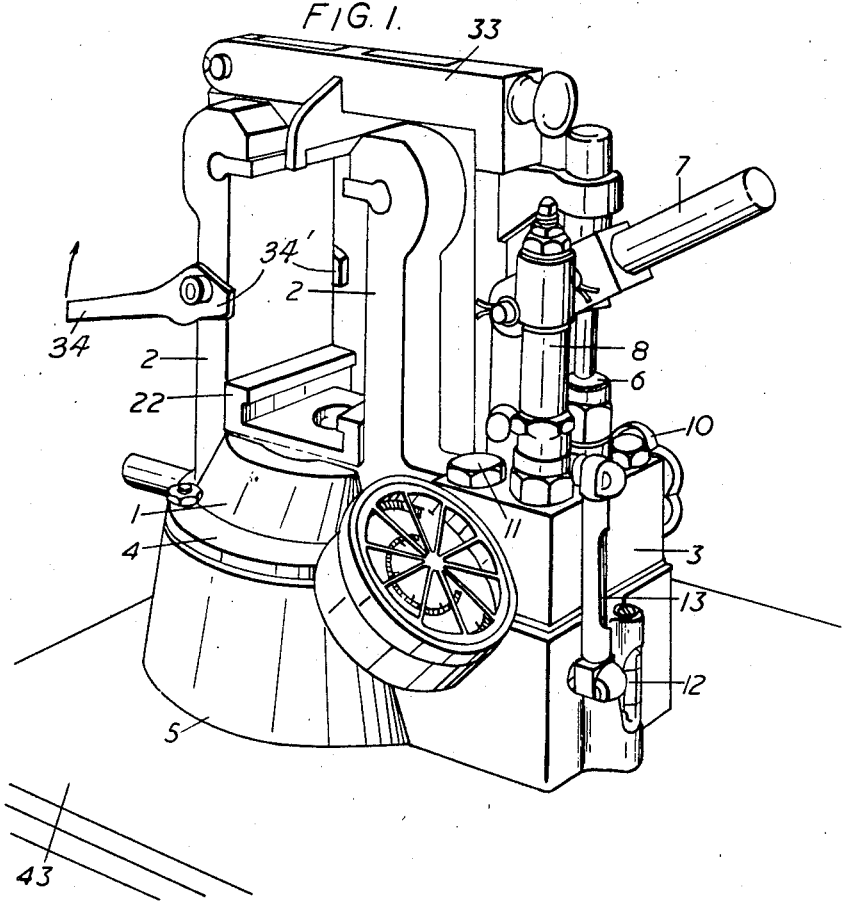

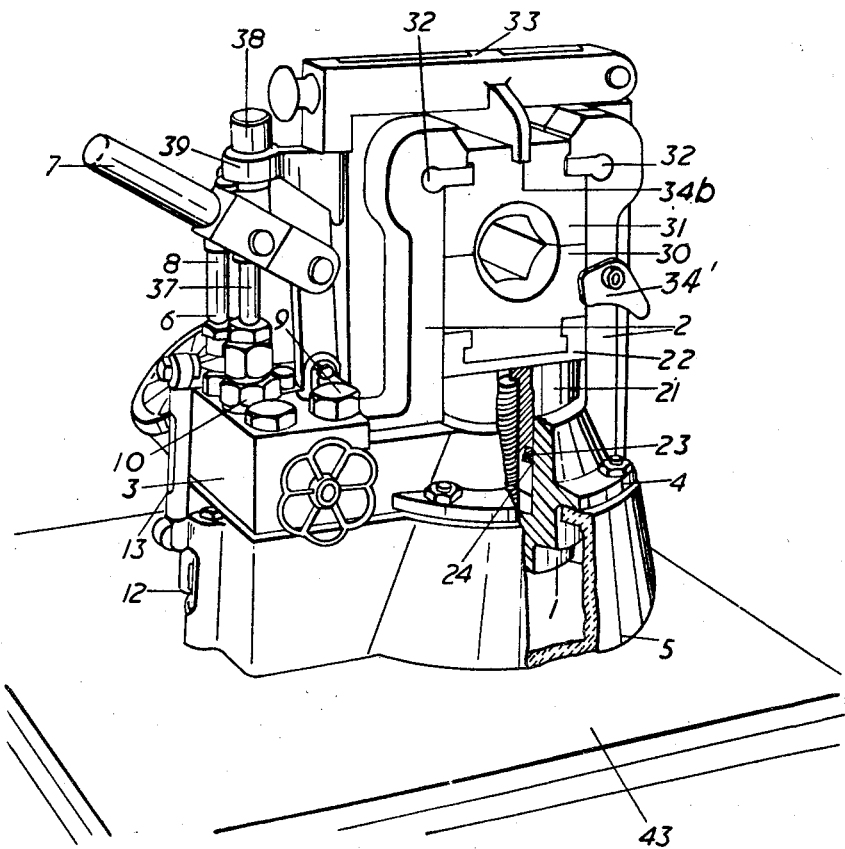

United States Patent Office 2,945,526
Patented July 19, 1960

---

2,945,526

MANUALLY CONTROLLED PORTABLE HYDRAULIC COMPRESSORS

Severino Cristiani, Milan, Italy, assignor to A. Salvi & Co. gia I.F.I., Milan, Italy Filed Aug. 10, 1955, Ser. No. 527,609

Claims priority, application Italy Aug. 18, 1954

3 Claims. (Cl. 153—1)

The present invention refers to portable hydraulic presses, manually controlled, particularly of the type employed for assembling compression type dead end fittings and for assembling joints or other fittings for joining in the field high and extra high electrical voltage transmission lines such as, for example, aluminum or copper conductors of relatively large diameter, and comprises a cylinder and two shoulders integral therewith, which extend upwards from the two sides of the cylinder and serve as a guiding means for a parallelepiped-shaped head integral with a piston sliding in said cylinder under the action of a hydraulic liquid. The press forces together opposite faces of a die into which the joint or other accessory has been placed, and thus serves to crimp a connecting sleeve to adjacent ends of wires or cables and thus join them together, or else to connect only one wire to an anchoring clamp.

It is an object of the invention to provide a portable hydraulic press of the mentioned type having in comparison with known presses the advantages of minimum weight and encumbrances in relation to the useful developed power, greater stability and more dependable performance, and conducive to easier control and repair on the ground also by non-specialized staff or unskilled personnel.

Other objects and many of the attendant advantages of this invention will be readily appreciated as the same becomes better understood by reference to the following detailed description when considered in connection with the accompanying drawings.

The hydraulic press according to the invention is characterized by the fact that the cylinder is made out of a single unitary monoblock comprising also the shoulder and the housing of the pump-and-valves assembly extends downwardly beyond a flange which laterally projects along the whole periphery of said monoblock and serves for the support of said monoblock upon a hydraulic fluid reservoir lying thereunder and forming a trough shaped base in which the cylinder is partially dipped.

Further features and advantages of the compressor according to the present invention will be more fully illustrated in the following description of an embodiment thereof, shown by way of example in the annexed drawings, in which:

Fig. 1 is a front view in perspective of the assembly formed by the compressor with its base and its supporting cradle and with both die-halves removed.

Fig. 2 is a rear view in perspective, partially sectioned of said assembly, with the die-halves in position.

Figure 4:
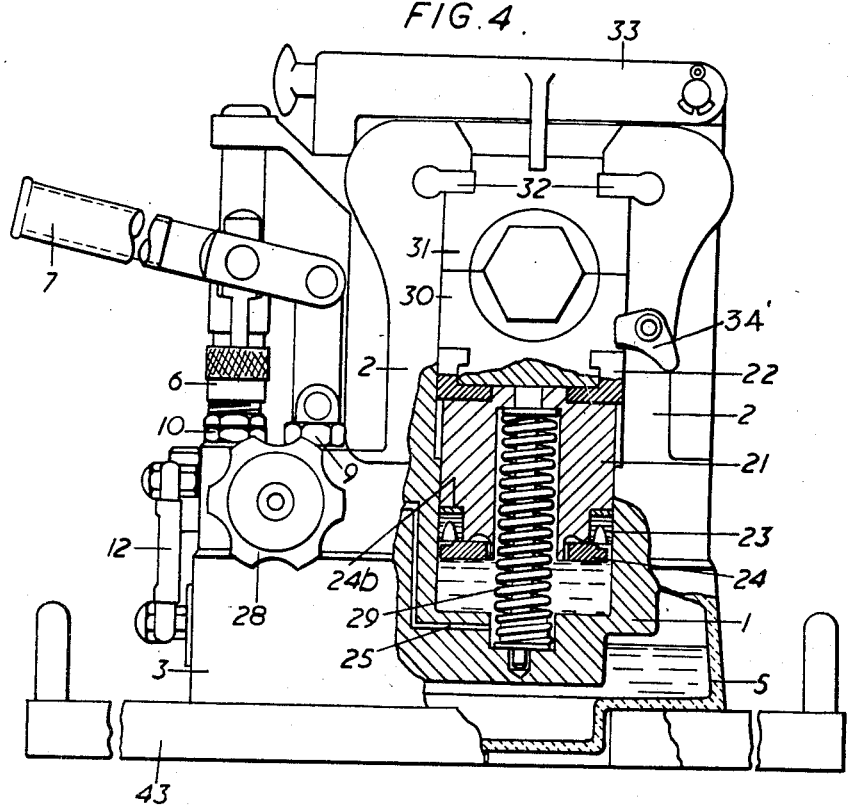
Fig. 4 shows also in a larger scale and in partial side view and partially sectioned, the same assembly.
Figure 3:
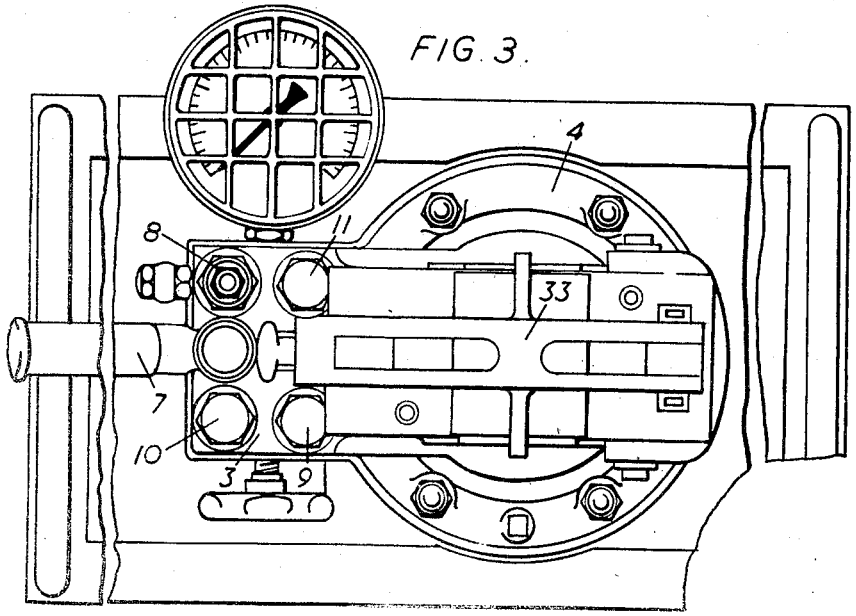
Fig. 3 is a plan view thereof in a large scale.

Although in the following description reference is always made to oil, it is clear that instead of oil any pressure medium can be used without departing from the scope of the invention.

The body of the press is a monoblock of high grade forged steel comprising the cylinder 1, the shoulders 2 projecting from the two sides thereof, the block 3 of the pump-and-valves group and the flange 4 for the connection of the monoblock to the reservoir 5.

In order to reduce as much as possible the weight of the press and its height and increase therefore its stability and consequently its ease of handling, the cylinder 1 of the press is partially submerged into the reservoir 5 and the seal is obtained through the flange 4 secured to the reservoir with the interposition of a suitable gasket, for example, of synthetic rubber. Said arrangement renders it possible to have the cylinder constantly under hydraulic load and therefore avoids many causes of malfunctioning of the pump and, therefore, of the press.

In the front portion of the monoblock is centrally located a manually controlled pump 6 drivably connected to a lever 7 for the hand control, at the side of which is placed a safety valve 8 of a known type automatically controlling the maximum service pressure.

The plug 9 covers a hole through which is effected the filling of the reservoir 5 with oil, and corresponds to the head of the filter inserted in the pump intake circuit, whereas the plugs 10 and 11 correspond to the intake valves and the release valves, respectively.

In the front portion of the reservoir 5 are arranged the level 12 indicating the oil level in the reservoir and a duct connecting the safety valve 8 with the underlying reservoir 5 and made of transparent material, arranged in a mount 13 provided with a window so as to make visible the working of the safety valve through the discharge of oil into the reservoir.

The service pressure is controlled by an armoured manometer graduated up to 2,000 atmospheres as maximum index and which is in communication with the high pressure conduit.

The piston 21 of the cylinder 1 (Fig. 4) is of cylindrical shape with the head 22 carrying the bottom half of a die, said head having a toed-in channel shape or papallelepiped shape and sliding with a little play between the walls of the shoulders 2. The tightness of the piston is ensured by a U-section ring gasket 23, for instance of a special synthetic rubber which is located in a suitable seat of the lower part of the piston and held up by the disc 24 with holes for the passage of the oil, said disc being screwed on at the bottom of the piston. Between the ring gasket 23 and its seat are interposed two rings 24b of fibre, bakelized paper or the like, cut in a point and assembled in such a way that the two cuts are staggered at 180°.

Under the action of the pressure the oil flows through the holes of disc 24 into the inner part of the U-gasket expanding same against the walls of the cylinder and of the piston and assuring thus the full tightness. The function of the cut rings 24b made of fibre or bakelized paper, is that of bearing against the cylinder walls, preventing thus squeezing of the rubber gasket through the same clearance between the cylinder and the piston. Such a squeezing would hinder the return stroke of the piston.

In the monoblock of the cylinder 1 are machined the duct 25 connecting the cylinder 1 to the pump 6 and a discharge duct (not shown) in the reservoir which is controlled by a valve actuated by the release handle 28.

Between the cylinder 1 and the piston 21 is interposed a tension spiral spring 29, one end of which is fixed to the bottom of the cylinder whereas the other end is secured to the bottom of the piston. Under the pressure of the oil the movement of the piston puts under tension the spring 29 and upon cessation of said action the spring retracts the piston which can be stopped at the desired point by interrupting the discharge of the oil in the reservoir by means of the release handle 28.

The release handle 28 is arranged so as to be actuated by the operator controlling at the same time the pump 6 by means of the lever 7.

The compression of the fitting is effected by means of a pair of dies, an upper and a bottom one. The bottom die 30 carries two machined guides which are inserted into two slots machined in the toed-in channel shaped or parallelepiped-shaped head 22 of the piston, whereas the two guides for the upper half or counter die 31 are formed by two holding and guiding elements 32 inserted into appropriate slots machined in the shoulder of the press and with which engage slots in the die. Said elements are so dimensioned as to support the maximum stress exerted by the piston and can be with the greatest ease reshaped or replaced in case of permanent deformations of a certain degree which can possibly show up after a long performance of the machine.

In order to avoid that, under the stress, the shoulders of the press might be subjected to distortion, they are solidly connected together by means of a steel closing bar 33 rotatably fixed at one end to one of the shoulders, whereas the other end is locked on the other shoulder by means of a ball retaining clutch. Under the action of the pressure the closing bar 33 maintains in the desired position the two shoulders and cannot be lifted up unless the pressure of the cylinder has been discharged.

The closing bar 33 is furthermore provided with two projections 34b, which when the bar is closed, determine the centering of the upper die and its remaining in the right seat.

For taking out the upper die it is sufficient to open the oil discharge and lift up the closing bar.

The bottom die is kept centered in its seat by means of the handle 34 pivoted on the shoulder of the press opposite the group of valves. When the handle is lowered down, the bottom die is locked in its seat and aligned with the upper die, whereas to extract same it is sufficient to cause the handle to effect a little upwards rotation.

The pump 6 has a body made of high grade steel connected to the carrying valve block 3.

The pump piston 37 actuated by the hand lever 7 is terminated by a cylindrical upper projection 38 guided in the ring 39 which forms a single body with the press shoulder.

For presses of greater power than the conventional ones having pistons with a diameter over 90 mm. and very long stroke, two pumps can be used in order to speed up the working times, that is one pump of greater diameter having the task of quickly bringing the dies into contact with the materials to be compressed and another pump of lesser diameter suitable to create the necessary high pressure without any excessive effort from the part of the operator.

The general constructive features of the two-pump press is identical, apart from the relative dimensions, to the press with a single pump above described.

For a practical working and transport possibility, the press is in any case assembled on a supporting cradle 43 constituted by a wooden plane provided with two gripping handles.

It is clear that the construction particulars of the press can vary from those above described and shown in the drawings without departing from the scope of the invention.

What I claim is:

1. In a portable hydraulic press for crimping fittings to cables, hoses and the like, a unitary monoblock forming a cylinder for containing a pressure medium, two shoulders integral with said cylinder and monoblock and extending upwards from opposing sides of said cylinder, a piston slidable in said cylinder, a toed-in channel shaped head for carrying a bottom die, said head being integral with said piston and slidable between said two shoulders, a flange laterally projecting from the periphery of said monoblock, a reservoir supporting said monoblock by said flange, said cylinder being positioned at least partially in said reservoir, a tension spring coaxial with said piston and interposed between said cylinder and said piston for the retraction of said piston for the completion of a working cycle, holding and guiding means in said shoulders for removably engaging a counter die therein, a counter die carried by said toed-in channel and provided with slots, detachable holding elements mating with said holding and guiding means in said shoulders for engaging said slots, said holding elements serving also as reaction elements for the piston pressure on said counter die, a closing bar hingedly connected to one of said shoulders and adapted to engage the other of said shoulders for resisting stresses applied to said shoulders, and a forked guide on said closing bar for engaging said fixed counter die to prevent the displacement thereof with said other shoulder engaged by said closing bar.

2. In a portable hydraulic press for crimping fittings to cables, hoses and the like, a unitary monoblock forming a cylinder for containing a pressure medium, two shoulders integral with said cylinder and monoblock and extending upwards from opposing sides of said cylinder, a piston slidable in said cylinder, a toed-in channel shaped head for carrying a bottom die, said head being integral with said piston and slidable between said two shoulders, a flange laterally projecting from the periphery of said monoblock, a reservoir supporting said monoblock by said flange, said cylinder being positioned at least partially in said reservoir, a tension spring coaxial with said piston and interposed between said cylinder and said piston for retraction of said piston for the completion of a working cycle, holding and guiding means in said shoulders for removably engaging a counter die therein, a closing bar hingedly connected to one of said shoulders and adapted to engage the other of said shoulders for resisting stresses applied to said shoulders, and a forked guide on said closing bar for engaging said fixed counter die to prevent the displacement thereof with said other shoulder engaged by said closing bar.

3. A portable hydraulic press according to claim 2, including detachable and replaceable holding elements mating with said holder and guiding means in said shoulders for engaging said counter die, said holding elements being so dimensioned and positioned as to support the stress exerted by said piston during a working cycle.

References Cited in the file of this patent

UNITED STATES PATENTS

| | | |
|---|---|---|
| 705,097 | Koken | July 22, 1902 |
| 841,150 | Hoberg et al. | Jan. 15, 1907 |
| 1,742,022 | Bauck | Dec. 31, 1929 |
| 2,113,087 | Jensen | Apr. 5, 1938 |
| 2,254,613 | Matthysse | Sept. 2, 1941 |
| 2,255,984 | Pfauser | Sept. 16, 1941 |
| 2,353,115 | Poreau | July 4, 1944 |
| 2,410,298 | Mirel | Oct. 29, 1946 |
| 2,473,694 | Renick | June 21, 1949 |
| 2,533,943 | Klein | Dec. 12, 1950 |
| 2,568,054 | Clapp | Sept. 18, 1951 |
| 2,646,706 | Palmer | July 28, 1953 |
| 2,664,073 | Pine | Dec. 29, 1953 |
| 2,696,850 | Peterson | Dec. 14, 1954 |
| 2,765,019 | Evans | Oct. 2, 1956 |
| 2,772,715 | Neijstrom | Dec. 4, 1956 |